US010343493B2

United States Patent
Terasawa et al.

(10) Patent No.: US 10,343,493 B2
(45) Date of Patent: Jul. 9, 2019

(54) AIR CONDITIONING ROUND REGISTER

(71) Applicant: TOYODA GOSEI CO., LTD., Kiyosu-shi, Aichi-ken (JP)

(72) Inventors: Kengo Terasawa, Kiyosu (JP); Nobuhiro Terai, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 373 days.

(21) Appl. No.: 15/213,552

(22) Filed: Jul. 19, 2016

(65) Prior Publication Data

US 2017/0036508 A1 Feb. 9, 2017

(30) Foreign Application Priority Data

Aug. 4, 2015 (JP) .................................. 2015-154028

(51) Int. Cl.
*B60H 1/34* (2006.01)

(52) U.S. Cl.
CPC ........... *B60H 1/345* (2013.01); *B60H 1/3442* (2013.01); *B60H 2001/3471* (2013.01)

(58) Field of Classification Search
CPC ............... B60H 1/3421; B60H 1/3428; B60H 2001/3471; B60H 1/3442; B60H 1/3414; B60H 1/345; B60H 1/0065; F24F 13/065; F24F 13/1413
USPC ........................................ 454/152, 154, 155
See application file for complete search history.

(56) References Cited

U.S. PATENT DOCUMENTS 5,967,891 A * 10/1999 Riley ................... B60H 1/3442
454/154
2014/0230942 A1 8/2014 Takai et al.
2016/0361979 A1* 12/2016 Brinas ................. B60H 1/3442

FOREIGN PATENT DOCUMENTS

| JP | H02-060009 U | 5/1990 |
| JP | 06-053220 U | 7/1994 |
| JP | H06-055820 U | 8/1994 |
| JP | 2014-088115 A | 5/2014 |
| JP | 2014088115 A * | 5/2014 |
| JP | 2014-184947 A | 10/2014 |
| JP | 2014-214997 A | 11/2014 |
| JP | 2015-031494 A | 2/2015 |

OTHER PUBLICATIONS

Office Action dated Jul. 24, 2018 issued in corresponding JP patent application No. 2015-154028 (and English translation).

* cited by examiner

*Primary Examiner* — Steven B McAllister
*Assistant Examiner* — Ko-Wei Lin
(74) *Attorney, Agent, or Firm* — Posz Law Group, PLC

(57) ABSTRACT

An air conditioning round register includes a cylindrical retainer, an annular outlet ring supported so as to be able to be rotated in any direction, an opening and closing fin body supported so as to be able to be tilted, a control rotated with fingers, and a mechanism that converts rotation of the control into tilt of the fin body. The control includes a branch connection part placed on a central axis of the outlet ring, and three branches radially extending from the branch connection part and disposed at regular angular intervals around the central axis. At the branch connection part, a front end of each crotch surface portion between adjacent branches has a radius of 10 to 30 mm in front view. The front end of each crotch surface portion protrudes farther forward than a front end of the retainer by 8 to 15 mm.

6 Claims, 6 Drawing Sheets

SHUT MODE

DIFFUSED-AIR BLOWING MODE

FULL-OPEN MODE

SPOT-AIR BLOWING MODE

WHEN CONTROL IS HELD

WHEN CONTROL IS ROTATED

AIR CONDITIONING ROUND REGISTER

TECHNICAL FIELD

The present invention relates to an air conditioning round register that is an air outlet of an air conditioner provided in, for example, vehicles (such as automobiles, trains, airplanes, and ships) and buildings. In this description, the term "rear" refers to an upstream side in a direction in which air conditioning air of the air conditioning round register flows, and the term "front" refers to a downstream side in the direction.

BACKGROUND ART

An air conditioning round register includes a cylindrical retainer, an opening and closing fin supported such that the fin is able to be tilted in the retainer, a control that is rotated with fingers, and a mechanism that converts the rotation of the control into the tilt of the fin (Patent Document 1).

The control often used is a round knob provided such that the round knob protrudes farther forward than a front end of the retainer from a center portion of the register (Patent Document 1). Since the round knob is held between two fingers for its rotation, holding and rotating the knob are not easy. Moreover, since a direction (i.e. radial direction) in which holding force is applied is different from a direction in which the knob is rotated, a greater load is applied to the fingers during the rotation. Increasing the size of the cylindrical knob to reduce the load to the fingers causes pressure loss and increased noise.

The present applicant has proposed another control that is made of a thin plate extending in an axial direction of the air passage, and is formed in a substantially triangular frame having a space therein through which the air can flow (Patent Document 2). Since this control with the substantially triangular frame is held between three fingers, holding and rotating the control are easier than the round knob. Moreover, since this control requires less amount of the holding force when rotated and allows most of the whole force to be applied in a rotational direction, it reduces the load to the fingers than the round knob. However, the control with the substantially triangular frame has insufficient fitting feel with fingers, because the surfaces of the triangular frame are almost flat even though they are concave to some extent. Moreover, the control has difficulty of fitting fingers to the control, because the control is almost housed in a space near the front end of the retainer. Thus, the control with the substantially triangular frame has been required to be improved to be easily held and rotated.

CITATION LIST

Patent Document

Patent Document 1: Japanese Utility Model Application Publication No. 06-53220 (JP 06-53220 U)
Patent Document 2: Japanese Patent Application Publication No. 2014-184947 (JP 2014-184947 A)

SUMMARY OF INVENTION

Technical Problem

An object of the present invention is to provide a control of an air conditioning round register that is easily held and has its increased stability and fitting feel when held, and is easily rotated with reduced load when rotated.

Solution to Problem

According to an aspect of the invention, an air conditioning round register includes: a cylindrical retainer; an annular outlet ring supported such that the annular outlet ring is able to be rotated in any direction in the retainer; an opening and closing fin body supported such that the fin body is able to be tilted in the outlet ring; a control that is rotated with fingers; and a mechanism that converts rotation of the control into tilt of the fin body. The control includes a branch connection part placed on a central axis of the outlet ring, and three branches radially extending from the branch connection part and disposed at regular angular intervals around the central axis. At the branch connection part, a front end of each crotch surface portion between adjacent branches has a radius of 10 to 30 mm in front view. The front end of each crotch surface portion protrudes farther forward than a front end of the retainer, by 8 to 15 mm.

Now, the effects of the present invention will be described.

The control is constituted of the branch connection part and the three branches. Therefore, the control is easily held between three fingers like a tap, as shown in FIG. 5A (arrows indicate force directions). When held, the control is highly stable and easily rotated. Moreover, the control requires less amount of the holding force when rotated and allows most of the whole force to be applied in a rotational direction, as shown in FIG. 5B. Accordingly, the control reduces the load to the fingers than the round knob.

The front end of each crotch surface portion between adjacent branches has a radius of 10 to 30 mm (more preferably, 15 to 25 mm). This improves the fitting feel with fingers, and thus the control is more easily held. As shown in FIG. 6A, this radius range includes and is slightly larger than a radius range, 16 to 24 mm, of index finger's pads of ten subjects and thus provides excellent fitting feel. If the radius is smaller than 10 mm, fingers may be engaged with the crotch surface portions. In contrast, if the radius is larger than 30 mm, fingers may slide on the crotch surface portions and become unstable.

In the control, the front end of each crotch surface portion protrudes farther forward than the front end of the retainer by 8 to 15 mm (more preferably, 11 to 15 mm). Thus, the pads of fingers are easily placed on the control, and thus the control is more easily held. As shown in FIG. 6B, this range of the projecting amount (protruding amount) includes and is larger than a range, 11 to 12.5 mm, of lengths from the tip to the pad of index fingers of ten subjects, and thus allows the finger pads to be easily placed on the control. This degree of the projecting amount allows the control to be less often touched unintentionally by a person or an object. If the projecting amount is smaller than 8 mm, finger pads are not easily placed on the control. In contrast, if the projecting amount is larger than 15 mm, the control is more often touched unintentionally by a person or an object, although the finger pads are equally easily placed on the control.

Preferably, each crotch surface portion has a front-rear length of 8 to 20 mm, and is tapered and widened toward a rear of the register. This is because the tapered portion improves the fitting feel with three fingers, allowing the control to be more easily held.

In the case where each crotch surface portion is tapered, it is preferable that the rear end of each crotch surface portion have a radius of 1.3 to 3 times the radius of the front end of each crotch surface portion in front view. This is because the fitting feel with three fingers and the compact connection part (reduced airflow resistance, and reduced pressure loss and noise) are both achieved. If the ratio is smaller than 1.3, the extent to which the crotch surface portion is tapered is small, and thus fitting feel with three fingers is insufficiently improved. In contrast, if the ratio is greater than 3, the extent to which the crotch surface portion is tapered is large, and thus the connection part is made larger (i.e. increased airflow resistance, and increased pressure loss and noise).

Advantageous Effects of Invention

According to the air conditioning round register of the present invention, the control produces the advantageous effects in which the control is easily held and has its increased stability and fitting feel when held, and is easily rotated with reduced load when rotated.

DESCRIPTION OF EMBODIMENTS

Figure 1A:
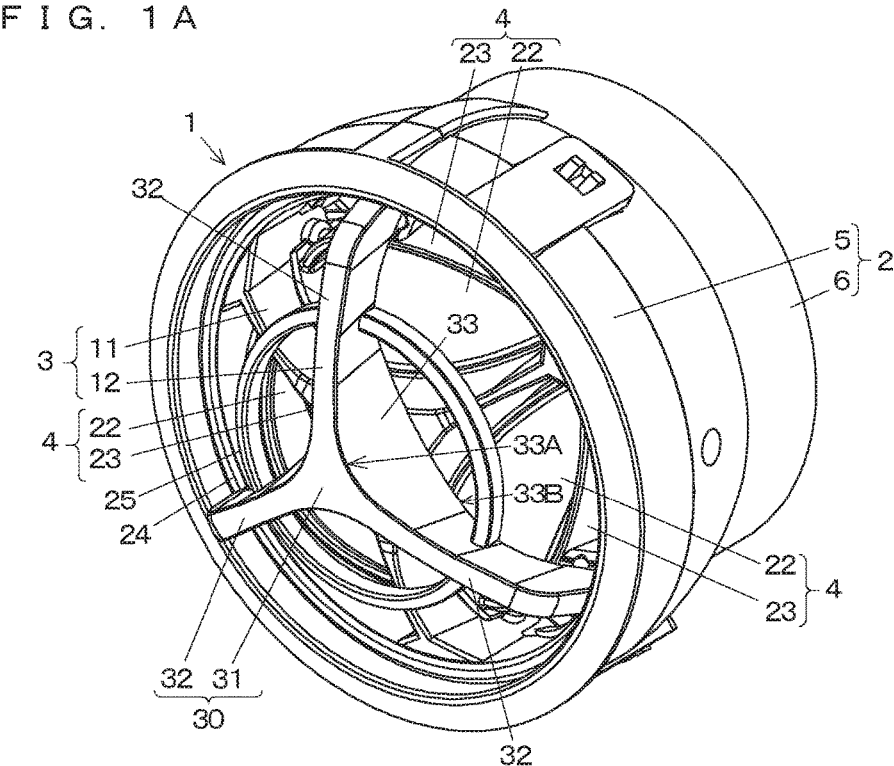
FIG. 1A is a perspective view of an air conditioning round register of an embodiment.
Figure 1B:
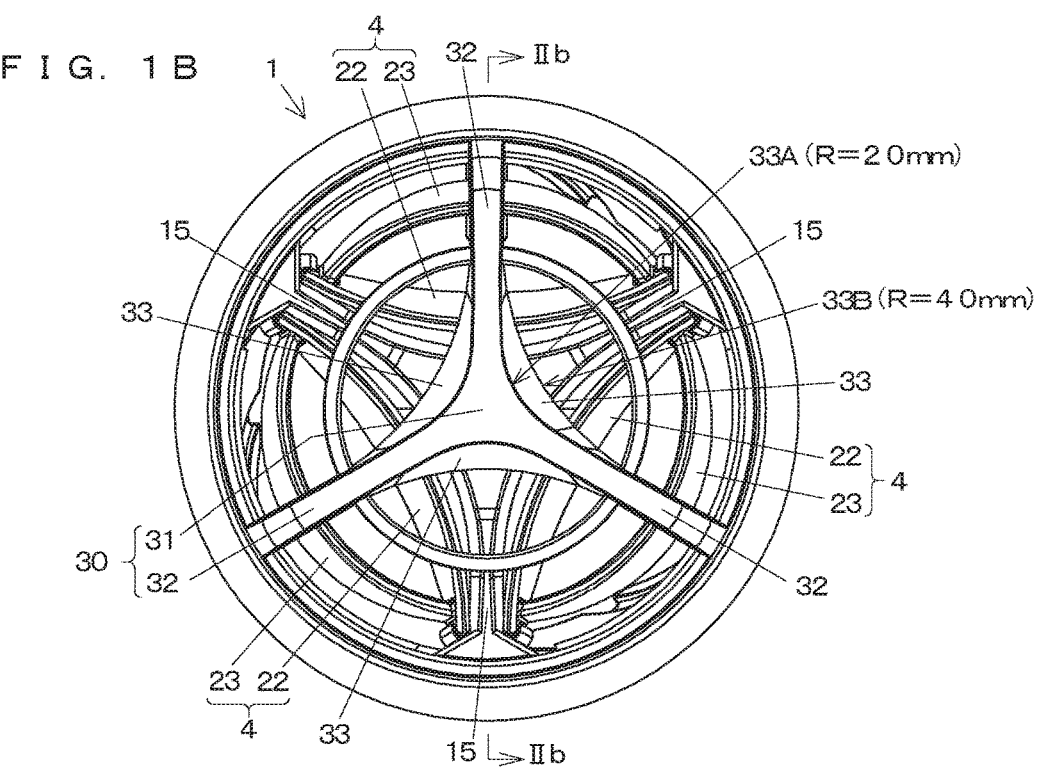
FIG. 1B is a front view of the air conditioning round register of the embodiment.
Figure 2A:
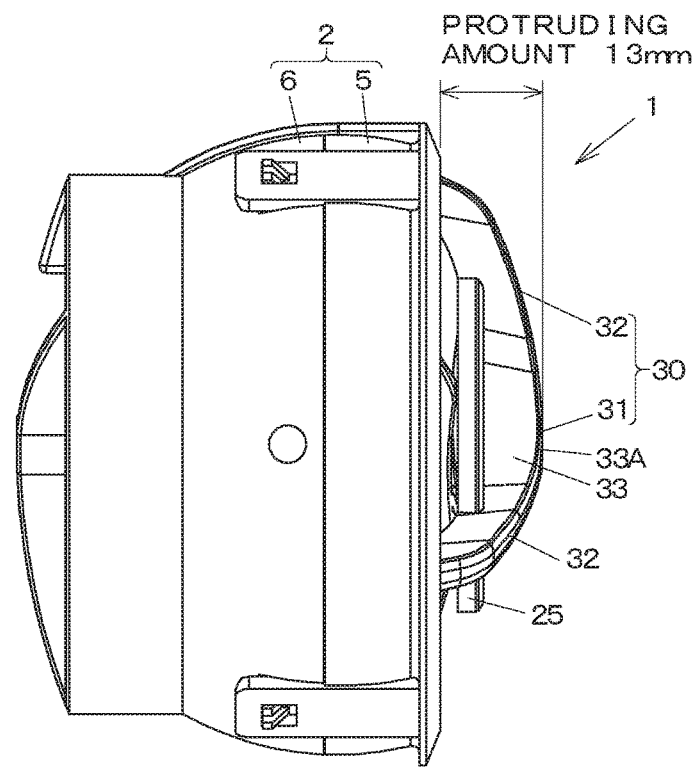
FIG. 2A is a left side view of the air conditioning round register.
Figure 2B:
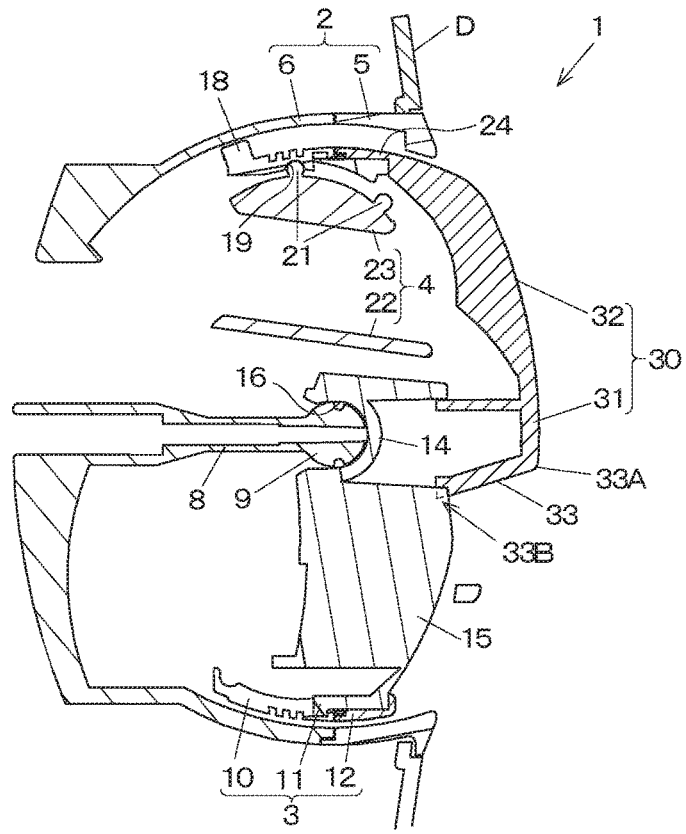
FIG. 2B is a sectional view taken along the line IIb-IIb of FIG. 1B.
Figure 3:
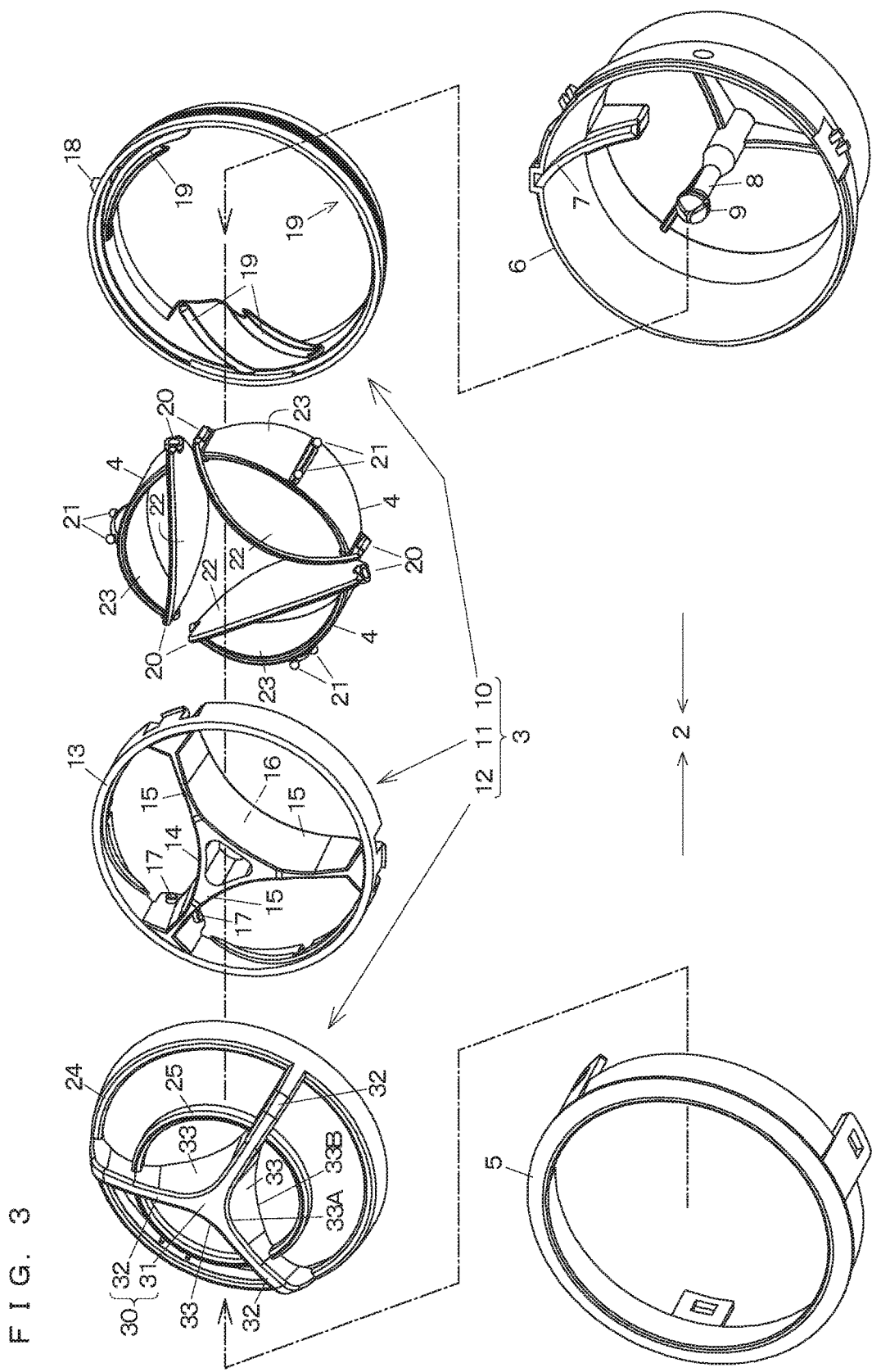
FIG. 3 is an exploded perspective view of the air conditioning round register.

The following description is made with reference symbols of an embodiment described later.

An air conditioning round register 1 includes the above-described cylindrical retainer 2; an annular outlet ring 3 supported by a ball joint 9 and 16 that is placed at a center of the retainer 2 such that the annular outlet ring 3 is able to be rotated in any direction in the retainer 2; an opening and closing fin body 4 supported so as to be able to be tilted in the outlet ring 3; a control 30 that is rotated with fingers; and a mechanism that converts the rotation of the control 30 into the tilt of the fin body 4. The control 30 includes a branch connection part 31 placed on a central axis of the outlet ring 3, and three branches 32 radially extending from the branch connection part 31 and disposed at regular angular intervals around the central axis of the outlet ring 3. At the branch connection part 31, a front end 33A of each crotch surface portion 33 between adjacent branches 32 has a radius of 10 to 30 mm in front view. The front end 33A of each crotch surface portion 33 protrudes farther forward than a front end of the retainer 2, by 8 to 15 mm. Preferably, each crotch surface portion 33 has a front-rear length of 8 to 20 mm, is tapered and widened toward the rear, and has a rear end 33B with a radius of 1.3 to 3 times the radius of the front end 33A of each crotch surface portion 33 in front view.

Aspects of the control 30 may include an aspect in which the control 30 is rotated on the central axis of the outlet ring 3 together with the outlet ring 3 and the fin body 4, and an aspect in which the control 30 is rotated on the central axis of the outlet ring 3 independently of the outlet ring 3 and the fin body 4.

The former aspect can be achieved by joining the control 30 and the outlet ring 3 by fitting, bonding, integral molding or the like.

In the former aspect, three fin bodies 4 may be provided such that the three fin bodies 4 are accommodated in three fan-shaped areas, in a one-to-one relationship. The areas are formed by equally dividing the interior of the outlet ring 3 around the central axis. Moreover, this aspect may include the following two aspects.

(1) Aspect in which each of the branches 32 is placed in front of a center portion of each of the fin bodies 4. According to this aspect, each of the branches 32 prevents a foreign object from being inserted into the register from the front of the register and touching each of the fin bodies 4.

(2) Aspect in which each of the branches 32 is placed in front of a portion between adjacent fin bodies 4. According to this aspect, airflow resistance is reduced.

Embodiment 1

The air conditioning round register 1 of an embodiment shown in FIGS. 1A to 6B includes the cylindrical retainer 2 to be attached to an attached portion D (such as an instrument panel of a vehicle); the annular outlet ring 3 supported by the ball joint such that the annular outlet ring 3 is able to be rotated in any direction in the retainer 2; and the three fin bodies 4 supported so as to be able to be tilted in the outlet ring 3.

[Retainer 2]

The retainer 2 includes a rear retainer 6 and a front retainer 5. The rear retainer 6 has an inner surface formed in an inner-sphere surface in which an engagement groove 7 extending toward the central axis of the retainer 2 is formed. In addition, the rear retainer 6 is provided with a support column 8 that protrudes frontward in the central axis direction of the retainer 2. The support column 8 is provided with a ball stud 9 on a distal end of the support column 8. The front retainer 5 is formed in a ring, and the retainer 2 is fixed to the attached portion D such that the outer periphery of the front retainer 5 is fixed to the attached portion D.

[Outlet Ring 3]

The outlet ring 3 includes a base ring 10, a front ring 11, and a bezel 12. The front ring 11 and the bezel 12 are coupled to each other to rotatably move on the central axis of the outlet ring 3 with respect to the base ring 10. The outlet ring 3 has an outer surface formed in an outer-sphere surface as a whole, and is disposed in the retainer 2 such that the outer surface of the outlet ring 3 slidably contacts the inner surface of the rear retainer 6, which is formed in an inner-sphere surface.

A projection 18 is provided on an outer surface of the base ring 10. The projection 18 is engaged with the engagement groove 7. In addition, in the inner surface of the base ring 10 formed in an inner-sphere surface, three pairs of guide grooves 19 are formed at regular intervals in a circumferential direction. The pairs of guide grooves 19 are each constituted of two grooves that spirally extend in parallel to each other in the inner surface of the base ring 10.

The front ring 11 has an annular ring 13, a connection part 14 placed at a center of the annular ring 13, and three spokes 15. The three spokes 15 are disposed at regular angular intervals, extends radially from the connection part 14 to the ring 13, and connected to the ring 13. A socket 16 is formed in the connection part 14, which is engaged with the ball stud 9. Both the socket 16 and the ball stud 9 constitute a ball joint. Axial projections 17 protrude on both sides of each spoke 15 near the ring 13.

The bezel 12 has a concentric annular outer ring 24 and inner ring 25, and the control 30 is integrally formed.

The control 30 includes the branch connection part 31 placed on the central axis of the outlet ring 3, and three branches 32. The three branches 32 are disposed at regular angular intervals around the central axis, and extend radially from the branch connection part 31. The three branches 32 are connected to the outer ring 24 and the inner ring 25. The bezel 12 is fixed to the front ring 11 by fitting or bonding. The three branches 32 are shifted by 60 degrees with respect to the three spokes 15, around the central axis of the outlet ring 3. That is, each of the branches 32 is placed in front of a central portion between adjacent spokes 15.

At the branch connection part 31, the front-rear length of each crotch surface portion 33 between adjacent branches is 15 mm. The front end 33A of each crotch surface portion 33 protrudes farther forward than a front end of the retainer 2 by 13 mm (protruding amount). The front end 33A of each crotch surface portion 33 has a radius of 20 mm in front view. Each crotch surface portion 33 is tapered and widened toward the rear, and has the rear end 33B with a radius of 40 mm (i.e. two times the radius of the front end) in front view.

The above-configured outlet ring 3 can be rotated (swung), with the control 30 held between fingers, around the ball stud 9 in the retainer 2, in such a direction that the central axis of the outlet ring 3 is changed. This swing changes the direction in which the air conditioning air blows.

As to the rotation of the outlet ring 3 around the ball stud 9 and on the central axis, the bezel 12 and the front ring 11 perform a rotational move when rotational operation of the control 30 performed by fingers. A rotational move of the base ring 10 is prevented by the engagement of the projection 18 to the engagement groove 7.

[Fin Body 4]

The three fin bodies 4 are provided such that the three fin bodies 4 are accommodated in three fan-shaped areas, in a one-to-one relationship. The areas are formed by equally dividing the interior of the outlet ring 3 around the central axis. That is, each of the fin bodies 4 is disposed in a corresponding fan-shaped area between adjacent spokes 15. Two axial projections 17 of the adjacent spokes 15 are engaged with two engagement holes 20 formed in the fin body 4, and thus the fin body 4 is pivotally supported by the front ring 11 so as to be able to rotationally move. The rotational-move axis of each fin body 4 is parallel to a chord of the corresponding fan-shaped area.

In this manner, when viewed in a direction of the central axis of the outlet ring 3, each branch 32 of the bezel 12 is located in front of a center of each fin body 4.

Each of the fin bodies 4 is provided with a pair of projections 21 that is constituted of two spherical projections to be engaged with the pair of guide grooves 19. In accordance with the relative rotational move of the front ring 11 with respect to the base ring 10, the pair of projections 21 is guided in the central axis direction (front-rear direction) of the outlet ring 3 along the pair of spiral guide grooves 19, and thus each of the fin bodies 4 is tilted (rotationally moved). That is, the pair of guide grooves 19 and the pair of projections 21 are the mechanism that converts the rotation of the control 30 into the tilt of the fin bodies 4.

Each of the fin bodies 4 includes a main fin 22 and a sub-fin 23 that are connected to each other near the two engagement holes 20, and separated from each other in a middle portion between the two engagement holes 20. The front and back surfaces of the main fin 22 and the sub-fin 23 serve to guide the air conditioning air.

Now, the operation and effects of the air conditioning round register 1 configured in the above will be described.

First, the control 30 is held between three fingers and rotated on the central axis of the outlet ring 3. The bezel 12, the front ring 11, and the fin bodies 4 are then rotated together, and the pair of projections 21 of each fin body 4 is guided in the front-rear direction along the pair of spiral guide grooves 19, as described above. Accordingly, the tilt angle of the fin bodies 4 with respect to the central axis of the outlet ring 3 is changed, and thus the air blowing mode is changed as follows.

Figure 4A:
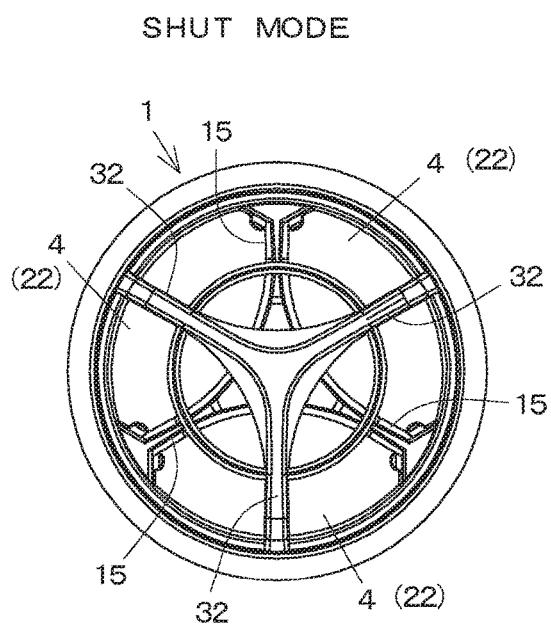
FIG. 4A is a front view of the air conditioning round register in a shut mode.

Shut mode: as shown in FIG. 4A, the tilt angle of the fin bodies 4 is set to a maximum angle to shut the interior of the outlet ring 3.

Figure 4B:
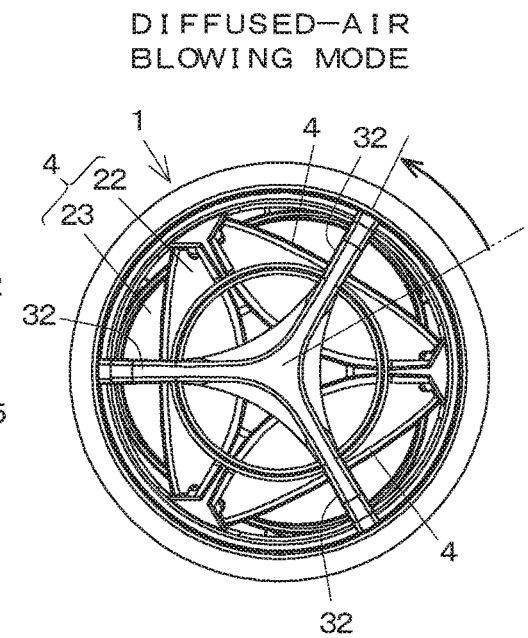
FIG. 4B is a front view of the air conditioning round register in a diffused-air blowing mode.

Diffused-air blowing mode: as shown in FIG. 4B, the tilt angle of the fin bodies 4 is set to be widened toward the front with respect to the central axis of the outlet ring 3.

Figure 4C:
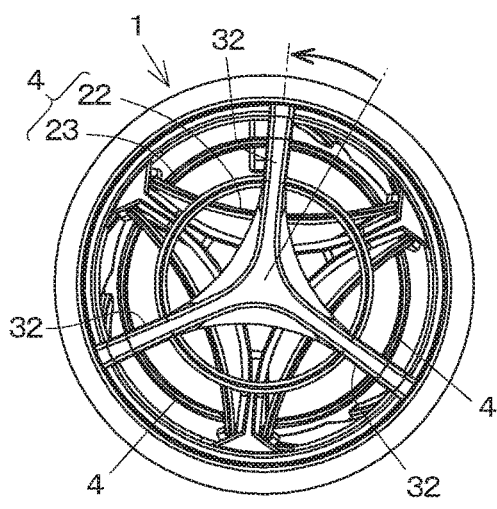
FIG. 4C is a front view of the air conditioning round register in a full-open mode.

Full-open mode: as shown in FIG. 4C, the tilt angle of the fin bodies 4 is set to be parallel to the central axis of the outlet ring 3.

Figure 4D:
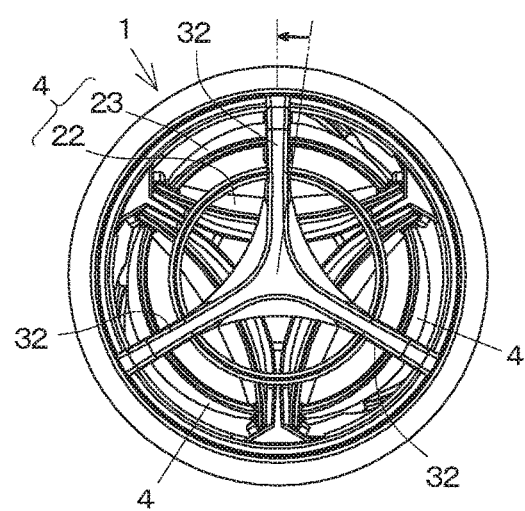
FIG. 4D is a front view of the air conditioning round register in a spot-air blowing mode.

Spot-air blowing mode: as shown in FIG. 4D, the tilt angle of the fin bodies 4 is set to be narrowed toward the front with respect to the central axis of the outlet ring 3.

In this case, the control 30 produces the following effects.

Figure 5A:
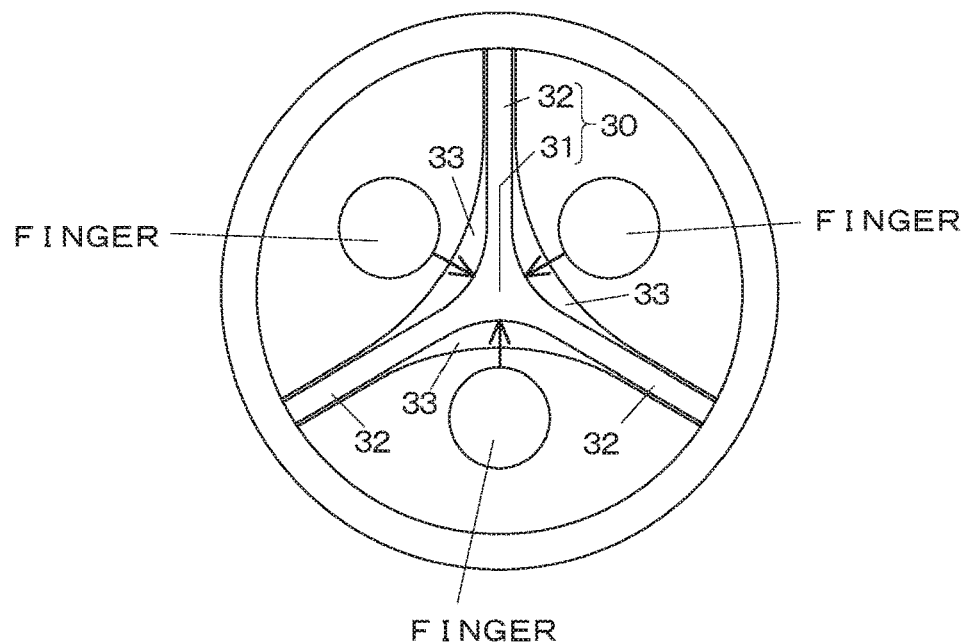
FIG. 5A is a diagram illustrating how forces are applied to a control of the air conditioning round register when the control is held between fingers.
Figure 5B:
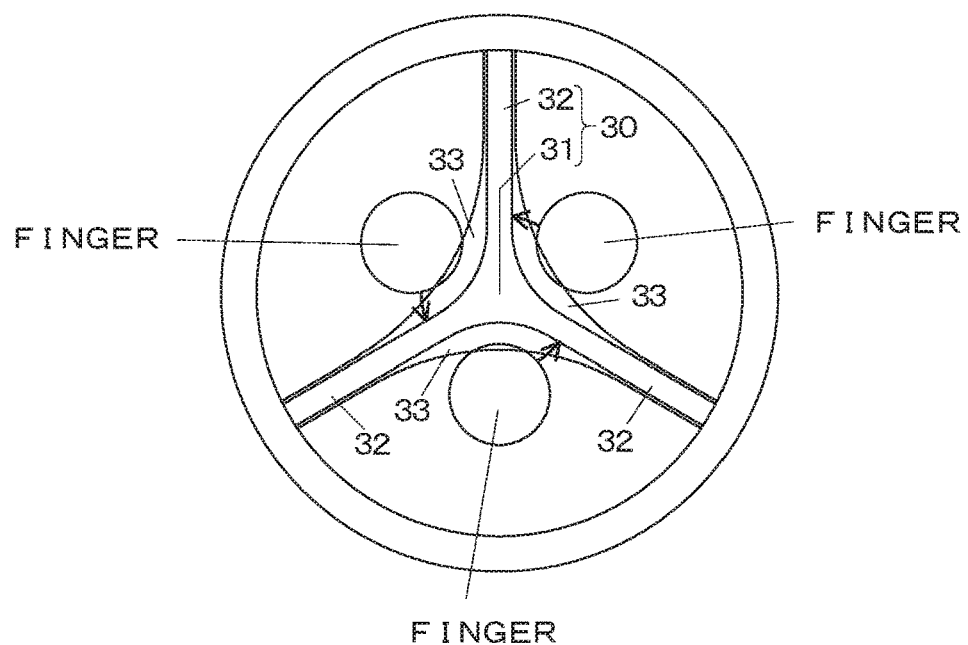
FIG. 5B is a diagram illustrating how forces are applied to the control of the air conditioning round register when the control is rotated with the fingers.
Figure 6A:
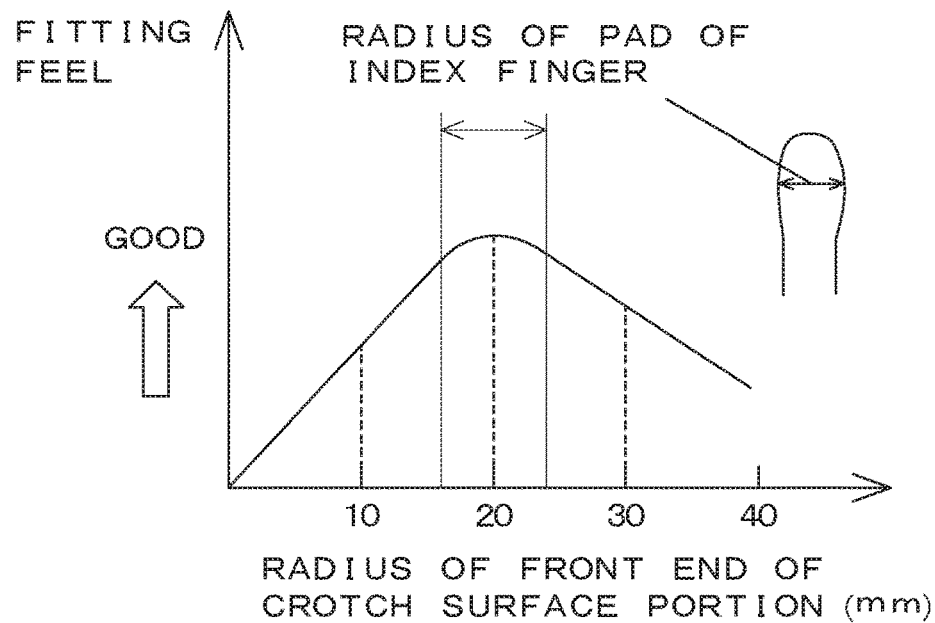
FIG. 6A is a graph illustrating a relationship between the radius and the fitting feel of the front end of a crotch surface portion of the control.
Figure 6B:
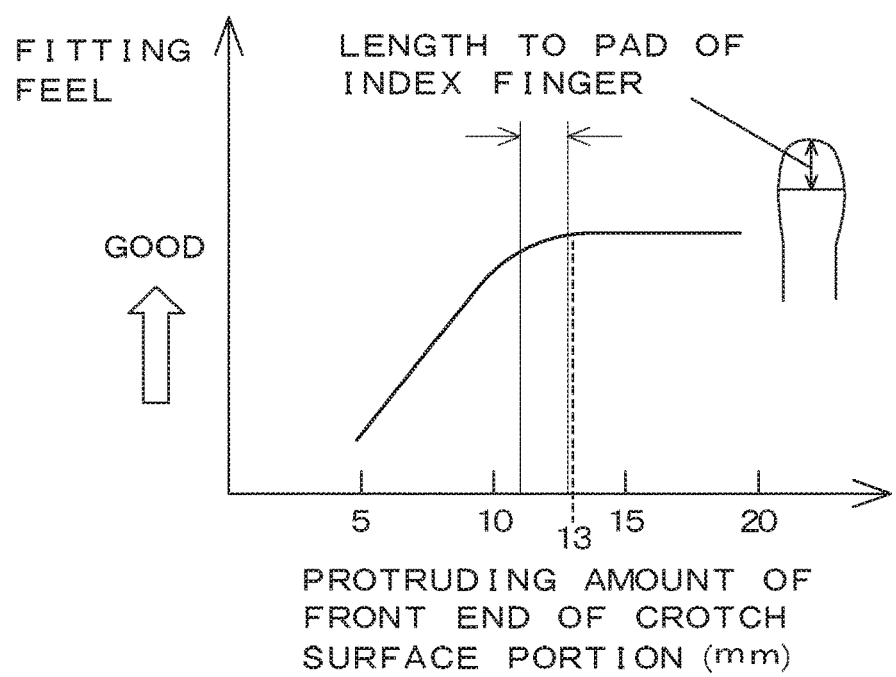
FIG. 6B is a graph illustrating a relationship between the protruding amount and the fitting feel of the front end of a crotch surface portion of the control.

The control 30 is constituted of the branch connection part 31 and the three branches 32. Therefore, the control 30 is easily held between three fingers like a tap, as shown in FIG. 5A (arrows indicate force directions). When held, the control 30 is highly stable and easily rotated. Moreover, the control 30 requires less amount of the holding force when rotated and allows most of the whole force to be applied in a rotational direction, as shown in FIG. 5B. Accordingly, the control 30 reduces the load to the fingers than the round knob.

The front end 33A of each crotch surface portion 33 between adjacent branches 32 has a radius of 20 mm. This improves the fitting feel with fingers, and thus the control 30 is more easily held (see above-described FIG. 6A).

In the control 30, the front end 33A of each crotch surface portion 33 protrudes farther forward than the front end of the retainer by 13 mm (protruding amount). Thus, the pads of fingers are easily placed on the control 30, and thus the control 30 is more easily held (see above-described FIG. 6B). This degree of the protruding amount allows the control 30 to be less often touched unintentionally by a person or an object.

In the control 30, each crotch surface portion 33 has a front-rear length of 15 mm, is tapered and widened toward the rear, and has the rear end 33B with a radius of 2 times the radius of the front end 33A of each crotch surface portion 33 in front view. This increases the fitting feel with three fingers, and achieves ease of holding the control 30 as well as the compact control 30 (reduced airflow resistance, and reduced pressure loss and noise).

As described above, when the control 30 is held between fingers and rotated (swung) around the ball stud 9 in the retainer 2, in such a direction that the central axis of the outlet ring 3 is changed, the direction in which the air conditioning air blows is changed due to the swing of the control 30. At this time as well, the above effects are produced by the control 30.

As described above, each of the branches 32 of the bezel 12 is placed in front of a center of each of the fin bodies 4. Accordingly, the branches 32 prevent a foreign object from being inserted into the register from the front of the register and touching the respective fin bodies 4.

The present invention is not limited to the above embodiment, and may be embodied, modified as required, without departing from the scope and the spirit of the invention, as exemplified in "DESCRIPTION OF EMBODIMENTS."

REFERENCE SIGNS LIST

1 Air conditioning round register
2 Retainer
3 Outlet ring
4 Fin body
5 Front retainer
6 Rear retainer
7 Engagement groove
8 Support column
9 Ball stud
10 Base ring
11 Front ring
12 Bezel
13 Ring
14 Connection part
15 Spoke
16 Socket
17 Axial projection
18 Projection
19 Pair of guide grooves
20 Engagement hole
21 Pair of projections
22 Main fin
23 Sub-fin
24 Outer ring
25 Inner ring
30 Control
31 Branch connection part
32 Branch
33 Crotch surface portion
33A Front end
33B Rear end
D Attached portion

The invention claimed is:

1. An air conditioning round register comprising:
a cylindrical retainer;
an annular outlet ring supported in the retainer such that the annular outlet ring is able to be rotated in any direction in the retainer; and
three opening and closing fin bodies supported such that the fin body are able to be tilted in the outlet ring, wherein
the outlet ring includes a control that is rotated with a user's fingers,
each of the fin bodies includes at least part of a mechanism that converts rotation of the control into tilt of the fin bodies,
the mechanism includes a guide groove, which is formed in the outlet ring, and a projection, which is provided on each of the fin bodies and engaged with the guide groove,
the three fin bodies are provided such that the three fin bodies are accommodated in three fan-shaped areas, in a one-to-one relationship,
the areas are formed by equally dividing an interior of the outlet ring around a central axis of the outlet ring,
two axial projections, which protrude from the outlet ring, are engaged with two engagement holes, which are formed in each of the fin bodies, and each of the fin bodies is pivotally supported by the outlet ring so that each of the fin bodies is rotationally movable about a rotational axis,
the rotational axis of each of the fin bodies is parallel to a chord of a corresponding fan-shaped area,
each of the fin bodies includes a main fin and a sub-fin, which are separated from each other in a middle portion in a circumferential direction, and front and back surfaces of the main fin and the sub-fin serve to guide air conditioning air,
the control includes a branch connection part, which is placed on the central axis of the outlet ring, and three branches, which extend radially from the branch connection part and are disposed at equal angular intervals around the central axis,
at the branch connection part, curved crotch surfaces are formed between adjacent ones of the branches, and a front section of each curved crotch surface has a radius of curvature of 10 to 30 mm; in a front view, and
each of the front sections protrudes farther forward than a front end of the retainer by 8 to 15 mm.

2. The air conditioning round register according to claim 1, wherein each curved crotch surface has a front-rear length of 8 to 20 mm and is tapered and widened toward a rear of the register.

3. The air conditioning round register according to claim 2, wherein a rear end of each curved crotch surface has a radius of curvature of 1.3 to 3 times the radius of the corresponding front section in a front view.

4. The air conditioning round register according to claim 1, wherein the control is rotated on the central axis of the outlet ring together with the outlet ring and the fin bodies.

5. The air conditioning round register according to claim 1, wherein each of the branches is placed in front of a center of each of the fin bodies.

6. The air conditioning round register according to claim 1, wherein each of the branches is placed in front of a portion between adjacent fin bodies.

* * * * *